United States Patent
Rehm

[19]

[11] Patent Number: 6,015,966
[45] Date of Patent: Jan. 18, 2000

[54] CIRCUIT BOARD HEATING APPARATUS

[75] Inventor: Johannes Rehm, Schelklingen, Germany

[73] Assignee: Rehm Anlagenbau GmbH & Co., Blaubeuren-Seissen, Germany

[21] Appl. No.: 09/032,795

[22] Filed: Mar. 2, 1998

[30] Foreign Application Priority Data

Mar. 13, 1997 [DE] Germany ......................... 297 04 601 U

[51] Int. Cl.[7] ..................................................... F27B 9/06
[52] U.S. Cl. ........................... 219/388; 219/400; 432/128
[58] Field of Search ..................... 219/388, 400; 432/124, 128, 144, 145; 126/21 A, 67, 70; 165/104.31

[56] References Cited

U.S. PATENT DOCUMENTS

| | | | |
|---|---|---|---|
| 4,020,273 | 4/1977 | Dix et al. ....................................... | 13/7 |
| 5,193,735 | 3/1993 | Knight ........................................ | 228/42 |
| 5,573,174 | 11/1996 | Pekol . | |
| 5,573,688 | 11/1996 | Chanasyk et al. ....................... | 219/388 |
| 5,922,230 | 7/1999 | Yokota ..................................... | 219/388 |

FOREIGN PATENT DOCUMENTS 496 581 A1   7/1992   European Pat. Off. .

*Primary Examiner*—Tu Ba Hoang
*Assistant Examiner*—Shawntina Fuqua
*Attorney, Agent, or Firm*—Burns, Doane, Swecker & Mathis, L.L.P.

[57] ABSTRACT

In reflow soldering systems the circuit boards are conventionally transported in horizontal direction from a feed portion through a preheating portion, a main heat-treatment portion, a cooling portion and a discharge portion in linear fashion in the longitudinal direction of the system. Such reflow systems, however, are relatively long and therefore require a lot of space. According to the invention, a heating apparatus, in particular for a reflow solder system, for heating circuit boards is provided with a feed portion for feeding the circuit boards in a substantially horizontal direction, at least one heating portion following in transportation direction downstream of said feed portion, a discharge portion for discharging circuit boards supplied from the heating portion in a substantially horizontal direction, and with a transportation device connecting feed portion, heating portion and discharge portion, characterized in that a transportation path of the transportation device extends in the heating portion in a plane substantially in a direction transverse to the horizontal feed or discharge direction, and the transportation path connects feed and discharge portions in a substantially ring-like configuration.

34 Claims, 3 Drawing Sheets

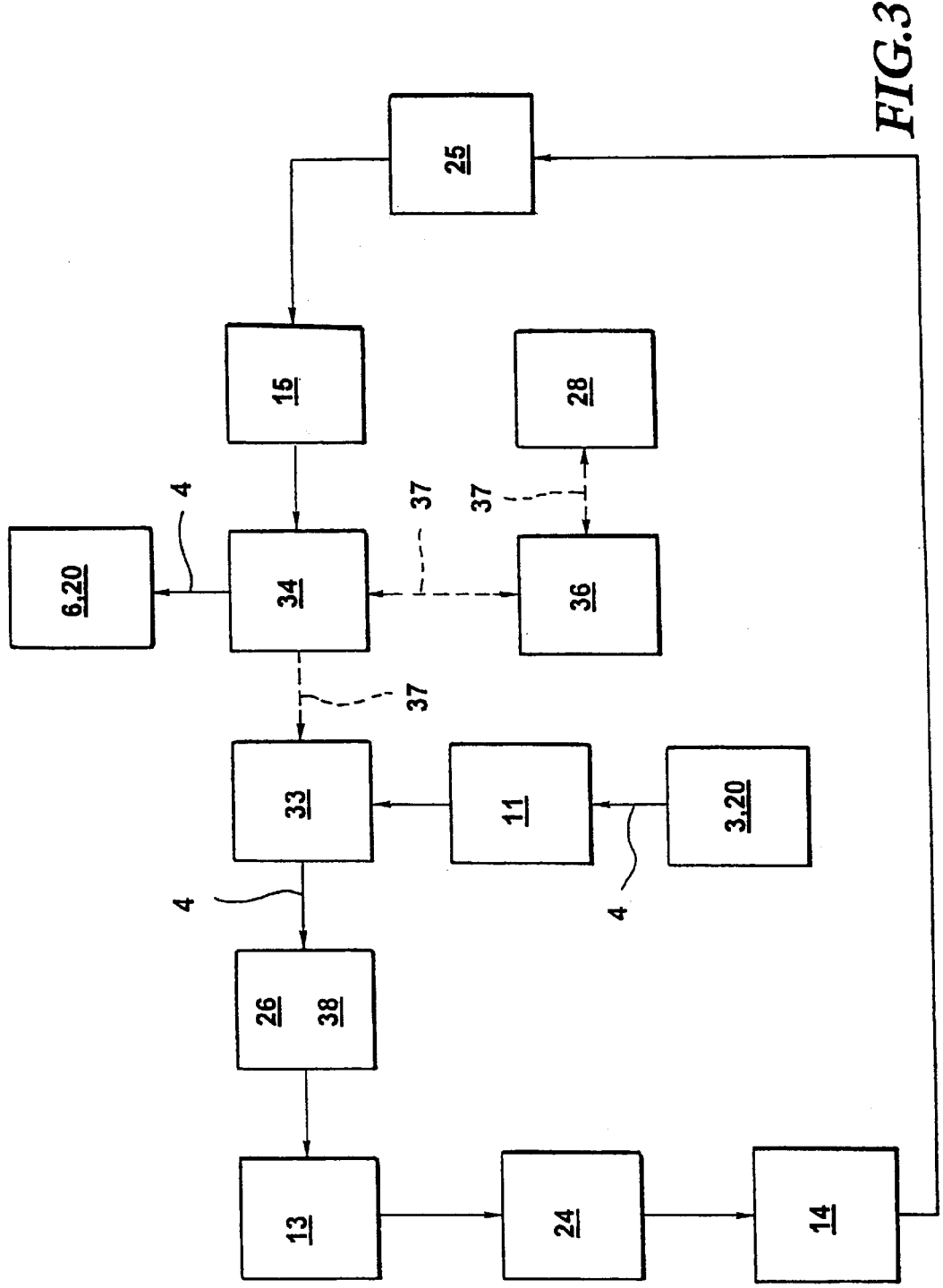

CIRCUIT BOARD HEATING APPARATUS

FIELD OF THE INVENTION

The present invention relates to a heating apparatus for heating, in particular, circuit boards, the apparatus comprising a feed portion for feeding the circuit boards in a substantially horizontal direction, at least one heating portion following in transportation direction downstream of the feed portion, a discharge portion for discharging the circuit boards supplied from the heating portion in a substantially horizontal direction, and a transportation device connecting feed portion, heating portion and discharge portion.

BACKGROUND OF THE INVENTION

In such a heating apparatus which is already known from practice, circuit boards, in particular, are supplied to the feed portion of the heating apparatus manually or automatically in continuous succession. The feed portion is followed by a heating portion. In the heating portion, the circuit boards are transported successively in a vertical conveyor upwards to a horizontal conveyor and from said horizontal conveyor to a further vertical conveyor for transporting the circuit boards back to the feed plane and to a discharge portion. In the prior-art heating apparatus, the heating portion is arranged in the transportation direction of feed portion and discharge portion between said portions. The two vertical conveyors and the horizontal conveyor connecting said vertical conveyors form a transportation device for the circuit boards through the heating portion. The heating portion serves, for instance, to remelt solder paste, i.e. for so-called reflow soldering, for curing adhesives for attaching components to the circuit board, for drying varnish on the circuit board, or the like.

The heating apparatus which is already known from practice has a relatively great constructional height, since the two vertical conveyors of the heating portion extend upwards relative to the feed and discharge portions. Moreover, the dimension of the prior-art heating apparatus in the transportation direction is relatively great, since the heating portion is arranged in the transportation direction between feed portion and discharge portion.

Furthermore, as becomes apparent from the known heating apparatus, a corresponding heating device is required for the heating portion for producing corresponding temperature profiles along the vertical conveyor and the horizontal conveyor. For instance, during heating by an air flow, many air supplies are required along the vertical conveyors with different temperatures of the air flow. A control of the air flows is relatively complicated for maintaining, for instance, a corresponding temperature profile in the upwardly transporting vertical conveyor in consideration of the rising, heated air. Moreover, venting devices with a corresponding control must be provided for air flow control, in particular, in the area of the horizontal conveyor which connects the upper ends of the vertical conveyors. The above-mentioned expensive and complex control and supply or discharge of hot air apply analogously to inert gases.

BRIEF SUMMARY OF THE INVENTION

Therefore, it is the object of the present invention to improve a heating apparatus comprising a feed portion, heating portion, discharge portion and transportation device in such a manner that the apparatus has a space-saving and compact structure and can more easily be controlled for producing reproducible temperature profiles within the heating portion.

This object is achieved in a heating apparatus comprising a feed portion, heating portion, discharge portion and transportation device in that a transportation path of the transportation device extends in the heating portion in a plane substantially in a direction transverse to the horizontal feed or discharge direction and the transportation path connects feed portion and discharge portion in an approximately ring-like configuration.

Thanks to the arrangement of the heating portion in a direction substantially transverse to the transportation direction as predetermined by the feed and discharge portions, and thanks to the approximately ring-like arrangement around the transportation direction, the space needed is considerably reduced, and also the constructional height. As a result, the heating portion is more easily accessible from all sides, for instance for maintenance or repair work.

For instance, since sections of the heating portion which have an elevated temperature for maintaining a specific temperature profile can be arranged with an increasing temperature one below the other, air or heated gas rising from sections of elevated temperature can be used in an improved controllable manner for preheating the circuit boards. As a result, the number of supply means is reduced, for instance, for gas with different temperatures for preheating. This simplifies the construction of the heating portion and the control thereof.

The heating portion can extend in substantially ring-like configuration from the feed portion downwards, below the feed portion and therethrough and then again upwards to the discharge portion. Feed portion and discharge portion may be arranged in one plane. Furthermore, the circuit boards may be lifted by a lifting device of the transportation device from the feed portion to the heating portion and then be guided in ring-like configuration to the discharge portion. In such a case the discharge portion may be arranged in the same plane as the feed portion, so that the circuit boards are again lowered by a corresponding lowering device of the transportation device from the heating portion to the discharge portion. Moreover, feed portion and discharge portion may also be arranged in different planes relative to one another, so that the circuit boards can be transferred to the heating portion, for instance, directly from the feed portion without any further lifting or lowering operations and subsequently after a ring-like return to the discharge portion they can be lifted or lowered with respect thereto.

Preferably, however, feed portion and discharge portion can be arranged in a single horizontal plane, so that the transfer to the heating portion can take place in the same horizontal plane or by the lifting device and then back to the discharge portion by the lowering device. The horizontal planes of feed portion and discharge portion may also be offset relative to one another in transverse direction. This serves the purpose that, for instance, circuit boards can be passed on in an untreated state directly from the feed portion to the discharge portion, while circuit boards to be treated are discharged in the discharge portion in laterally offset fashion relative to the untreated circuit boards.

In all of the above-mentioned cases regarding the arrangement of feed portion and discharge portion relative to one another and the arrangement thereof relative to the heating portion, the heating portion extends in substantially ring-like configuration and in a direction transverse to the transportation direction defined by feed portion and discharge portion and connects the two portions to each other.

To be able to reproduce and control a temperature profile for heating circuit boards in an accurate manner, the heating portion along the transportation path may comprise a preheating section, a thermal processing section and a cooling section. These sections may be decoupled from one another with respect to their temperature control. Moreover, hot gas which rises from the thermal processing section may flow at least through the preheating section if the latter is arranged accordingly relative to the thermal processing section.

To preheat the circuit boards in a simple manner, for instance, by upwardly flowing hot gas, the preheating section may be formed as a preheating shaft through which the transportation device passes vertically downwards. In this preheating shaft, a plurality of circuit boards can be transported downwards by the transportation device.

To transport a plurality of circuit boards in an analogous manner back to the discharge portion and to cool them at the same time, the cooling section may be designed as a cooling shaft through which the transportation device passes vertically upwards. Cooling is of a convective type, preferably by an active cooling gas transportation using blow-in openings and evacutating openings in circulating air operation.

To form the ring-like arrangement of the heating portion with preheating shaft and cooling shaft in a very simple manner, the thermal processing section may be designed as a connection shaft connecting preheating shaft and cooling shaft substantially at the lower ends thereof. In this connection shaft, i.e. in the thermal processing section, the real processing of the circuit boards takes place by way of reflow soldering, curing of adhesives, drying of varnish, or the like.

For instance, to prevent the escape of harmful materials during thermal processing of the circuit boards or the escape of a hot gas, or the like, which has been used, preheating shaft and/or connection shaft and/or cooling shaft may be designed in gas-tight fashion.

To prevent any reaction of the heating means, such as atmospheric oxygen, with materials of the circuit board, the components on the circuit board, the solder paste or the like, an inert gas or gas mixture may be contained in the preheating shaft and/or connection shaft and/or cooling shaft. In cases where a reaction of atmospheric oxygen is not to be expected, air may also be used for cooling, preheating and heating in the connection shaft.

Heat may be transferred to the circuit board, for instance, by means of heated gas. In this context, heating may be performed by a heating device assigned to the connection shaft. In cases where the atmosphere in the connection shaft just serves essentially as a protective gas, the heating device may, for instance, be designed as a device which directly transfers heat to the circuit boards. Such a heating device may be adequate, in particular, for curing adhesives or drying varnishes on the circuit board. To produce enough heat during reflow soldering, the heating device may additionally comprise a source of infrared radiation or other sources of heat radiation, at least at some points.

Morever, in the connection shaft, i.e. in the thermal processing portion, heating may take place only from above, only from below, from above and below or from all sides.

In a very simple case, the supply or discharge of circuit boards to or from the heating portion may take place in that transportation systems are assigned to feed portion and/or discharge portion. With the help of such a transportation system, the circuit board can be supplied from a different processing machine to the heating apparatus or transported away from said apparatus for further processing. Such transportation systems may be transportation belts, magazines, or the like.

To heat circuit boards for different processing purposes in different ways or to heat a circuit board in successive processing operations differently, the connection shaft may comprise at least two heating zones that are differently heatable by the heating device. Moreover, each heating zone may have assigned thereto a heating device of its own. The heating zones may be arranged one after the other during processing of a circuit board and may be arranged side by side when different circuit boards are being processed. It should here be noted that the connection shaft may comprise a number of processing lines that are arranged in parallel with one another and are independent of each other and of which all communicate with the preheating shaft and cooling shaft, respectively. This turns out to be particularly advantageous in cases where the processing time of the circuit boards in the connection shaft is longer than the time needed for transportation in the two other shafts. A better adaptation to the reduced transportation time in the preheating shaft and cooling shaft, respectively, is possible owing to the parallel processing of circuit boards.

The transportation device may, for instance, be of a continuous type and thus interconnect feed portion and discharge portion directly in a substantially ring-like configuration. To isolate the various shafts from one another in an improved manner, for instance, because of the different temperature conditions prevailing therein, the transportation device may comprise different transportation sections in the respective shafts, the transportation sectiong being interconnected by transfer devices.

To improve also the transfer of the circuit boards from the feed portion or to the discharge portion, further transfer devices may be arranged between the feed and discharge portion and the transportation device for transferring the circuit boards from the feed portion to the transportation device or from the transportation device to the discharge portion. When feed portion and discharge portion are arranged in one horizontal plane, one transfer device may be sufficient for a transfer to and from the transporation device.

The transportation device may be constructed such that it can directly transport circuit boards of specific sizes or also of different sizes. Such a transportation device may, for instance, be formed by conveyors which particularly support edges of the circuit boards and which transport the circuit boards along the total transportation path or, optionally, along the transportation sections which are interconnected by transfer devices.

To assign a corresponding conveyor to each circuit board during movement along the entire transportation path or along the various transportation sections, the transportation device may comprise article carriers which are movable along the transportation path at least in part.

The various transfer devices may be designed such that they transfer circuit boards directly or by way of article carriers. Such a transfer is, for instance, possible from the feed portion to an associated article carrier. The article carrier is then moved along the entire transportation path and is transferred itself by further transfer devices between the various transportation sections. Such a transfer device may be designed as a diverting device for diverting the article carrier or circuit board from one transportation section to the next one.

To control the transportation device, but also the entire heating operation in the heating apparatus, a corresponding control system may be assigned to the heating apparatus. The assignment may be such that the control system is connected via corresponding lines to the heating apparatus or, for instance, is arranged on the apparatus such that it is accessible from the outside. The transfer devices and the article carriers are, for instance, controlled by the control system. The article carriers may, for instance, be controlled such that their speed, distance, number, or the like, is controlled. It is thereby possible to keep the throughput of the heating apparatus, for instance, constant, or to use a varying number of article carriers in case of jams, malfunctions or lack of material.

To be able to transport and process circuit boards of different sizes in the heating apparatus, the use of article carriers which are adapted to the respective sizes is, for instance, possible. In a simplified embodiment, each article carrier may have an adjustable support device for receiving or supporting different sizes of circuit boards. Only one type of article carrier is thus needed. The article carrier may have an outer frame which is adapted to the largest size of the circuit boards to be transported. The supporting device for supporting smaller sizes is adjustably supported relative to the outer frame. The support device can support lateral edges of a circuit board and may optionally be provided with an additional central support. This support is also adjustably supported on the article carriers. The support device can be adapted to different circuit board sizes automatically in an adjusting station. More than one circuit board can also be transported by the article carrier. The support devices are then used in a corresponding number.

As already stated above, the article carriers can be circulated along the transportation path when the transfer devices are designed for transferring article carriers between the shafts. This reduces the total processing time. In this connection, it should once again be noted that feed portion and discharge portion, for instance, can also be designed as one portion from which the circuit boards are taken and again transferred after having been guided through the heating portion. Moreover, feed portion and discharge portion can be arranged successively in the horizontal transportation direction, so that circuit boards are returned in the transportation direction behind the feed portion to the discharge portion. As already pointed out, feed portion and discharge portion can be arranged at different levels. To control supply and discharge of the circuit boards independently, it is of advantage when the transportation belts which are assigned to the feed portion and the discharge portion, respectively, are separately controllable.

For an improved adaptation to throughput or material flow in the heating apparatus, the transportation device may have a buffer station for storing or removing article carriers. Depending on the kind of material, a corresponding number of article carriers will then be used. The buffer station can be controlled and operated by the control system of the transportation device.

To control the flow of material along the transportation path and the transfer from and to the feed portion and discharge portion, respectively, in an improved manner, sensors may be assigned to the feed portion and/or discharge portion and/or heating portion and/or transportation device.

In the embodiment with a vertically downwardly leading preheating portion and a vertically upwardly leading cooling portion which are connected in a substantially horizontal plane by a connection portion for thermal processing which is located below the feed and discharge level, the heating apparatus of the invention is of particular advantage to the vapor-phase soldering method. In this soldering method, a heat transfer is achieved by condensation of vapor preferably at the connection parts of the components to be soldered. A medium the boiling point of which is in the range of the liquidus temperature of the solder paste is used as the vapor. In a system with pressure compensation an area of saturated vapor is formed above the boiling liquid and has the same temperature as the boiling liquid. Media which are usable for vapor-phase soldering have a higher molecular weight than air or optionally inert gases used in the system. Therefore, in the heating apparatus of the invention with a vertically downwardly leading preheating shaft, a lower connection portion for heat treatment and a vertically upwardly leading cooling shaft, the heat treatment for carrying out the reflow soldering process by means of the vapor-phase soldering method can be performed in a particularly advantageous manner in the area of the saturated vapor above the boiling medium, the vapor being producible and retainable because of its weight in the lower regions without any additional special systems being needed for sealing purposes.

BRIEF DESCRIPTION OF THE DRAWINGS

An advantageous embodiment of the present invention will now be explained and described in more detail with reference to the figures attached to the drawing, in which:

FIG. 3 is a flow chart for the operation of the heating apparatus of the invention.

FIG. 1 is a simplified and basically perspective view of a heating apparatus 1 of the invention. The apparatus comprises a feed portion 3, a heating portion 5 and a discharge portion 6 which are arranged one after the other in transportation direction 4.

DETAILED DESCRIPTION OF THE INVENTION

Figure 1:
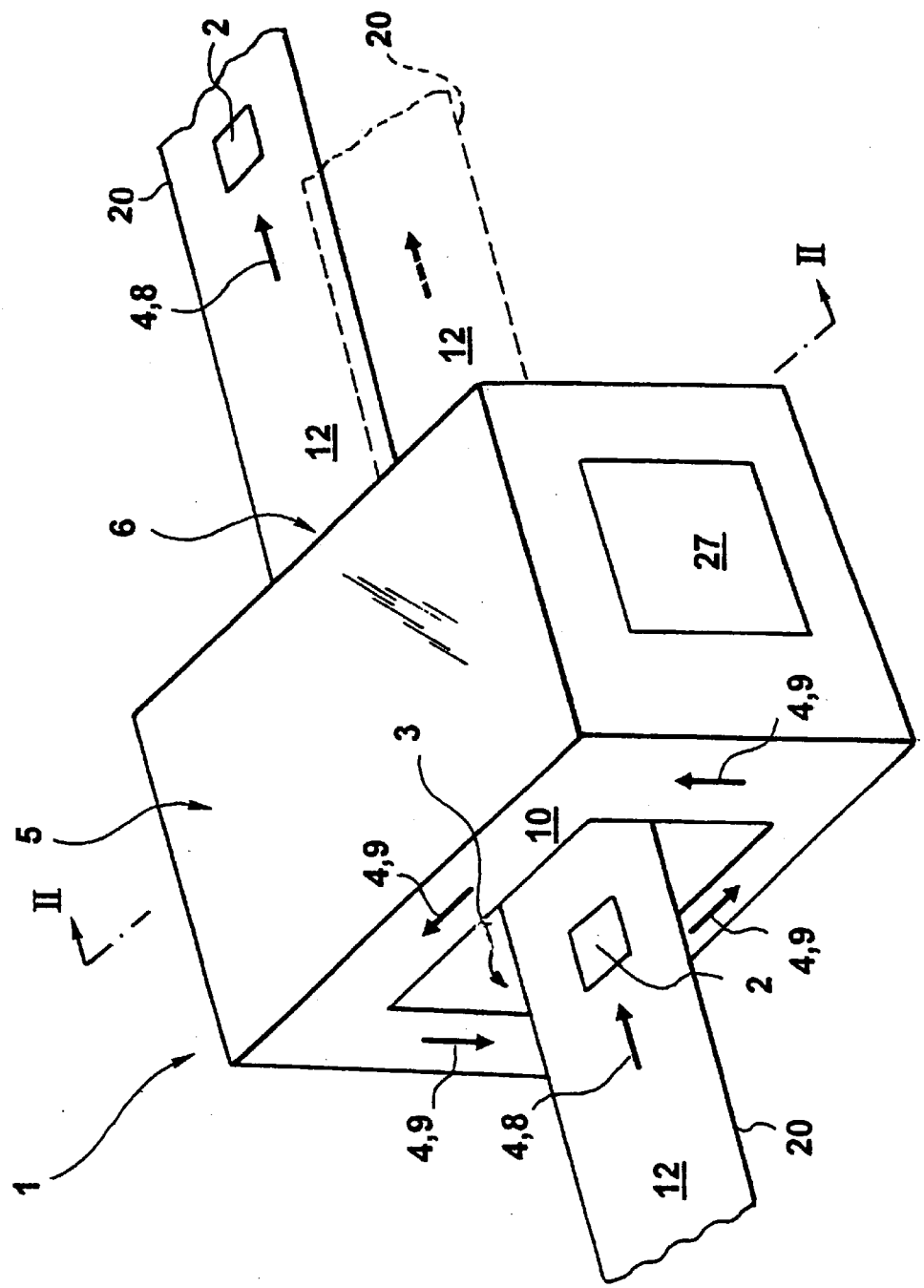
FIG. 1 is a perspective view of a heating apparatus of the invention, showing the principle thereof.

Circuit boards 2 can be fed via the feed portion 3 by means of a transportation system 20 to the heating portion 5. The transportation system 20 defines a horizontal plane 20 along which the circuit boards 2 can be fed in a horizontal direction 8 as the transportation direction 4.

The discharge portion 6 serves to discharge processed circuit boards 2 from the heating portion 5 and also comprises a transportation system 20 for transporting the circuit boards away. The transporation system 20 of the discharge portion 6 also defines a horizontal plane 12, and the circuit boards 2 are discharged in a horizontal direction 8 as the transportation direction 4.

A further transportation system 20 which is arranged in the same horizontal plane 12 as the transportation system 20 of the feed portion 3 is shown in broken line.

The transportation system 20 of the discharge portion 6 which is shown in full line is arranged in a horizontal plane 12 which is at a higher level than the horizontal plane of the transportation belt of the feed portion 3.

The relative arrangement of the transportation systems for feed portion and discharge portion may also be reversed.

Within the heating portion 5, the transportation direction 4 for the circuit boards 2 is along a transportation path 9 that extends substantially in ring-like fashion around the horizontal transportation direction 8 and in a vertical plane 10 which is perpendicular to the horizontal plane 12. The transportation path 9 extends substantially in ring-like configuration between feed portion 3 and discharge portion 6.

The heating portion 5 has assigned thereto a control system 27 for controlling the flow of material through feed portion, heating portion and discharge portion, and also further means which are particularly contained in the heating portion 5.

Figure 2:
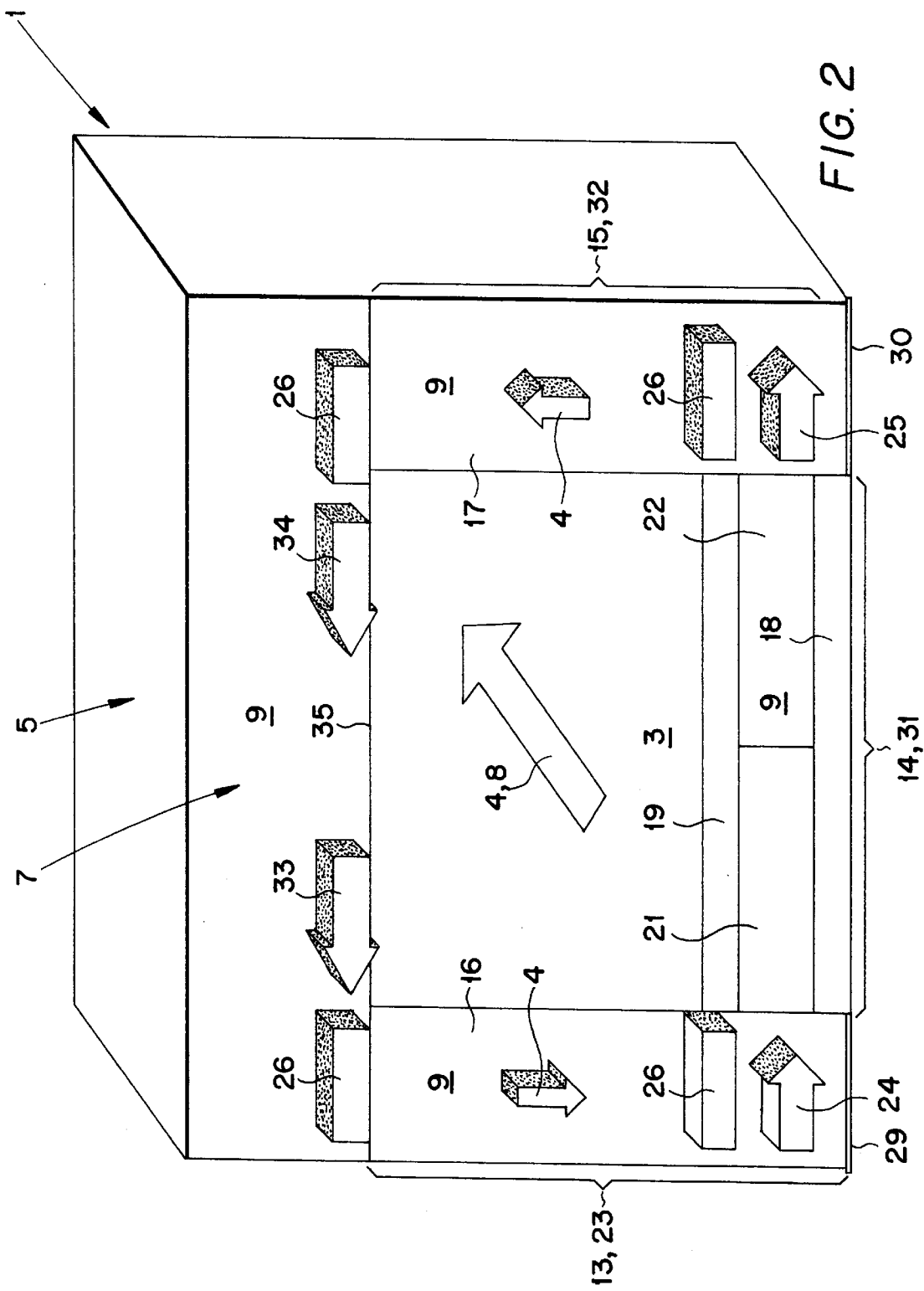
FIG. 2 is a section taken along line II—II of FIG. 1.

FIG. 2 is a basic illustration of a section taken along line II—II of FIG. 1.

In the illustrated embodiment the transportation path 9 encircles as a closed path the horizontal direction 8 from which the circuit boards are supplied or along which the circuit boards are discharged. Hence, the circuit boards are lifted onto and optionally lowered from a feed/discharge plane 35 of the heating portion 5 via a lifting/lowering device 11 (not shown), see FIG. 3.

In the feed plane 35 a transfer device 33 is arranged for transferring a circuit board to an article carrier 26. The carrier is movable at least along a transportation section 23 of the transportation path 9 along a preheating section 13 of the heating portion 5. The preheating section 13 is formed by a preheating shaft 16 which follows the feed plane 35 vertically downwards. In this shaft 16, the article carrier 26 can be lowered near to the lower end 29 of the preheating shaft 16. At this end, there is a further transfer device 24 for transferring the circuit board or the article carrier for transportation along a further transportation section 31 in the thermal processing section 14. The thermal processing section 14 is formed in a connection shaft 18 which connects the lower end 29 of the preheating shaft 16 to a lower end 30 of a cooling shaft 17 which follows in transportation direction 4. This shaft 18 has arranged therein at least one heating device 19 which transfers heat to the circuit board for reflow soldering, curing of adhesives, drying of varnish, or the like. In the illustrated embodiment, the heating device 19 is divided into two heating zones 21, 22 in which different temperature profiles may exist.

In transporation direction 4, the cooling shaft 17 extends vertically upwards, and a transfer device 25 for circuit boards which have been supplied from the connection shaft 18 and processed therein is arranged at the lower end of the cooling shaft, optionally with article carriers for transportation through a further transportation section 32. This carrier is movable upwards along the cooling shaft 17. At the upper end of the cooling shaft 17, the circuit board is discharged via a transfer device 34 from the article carrier 26 to the transporation belt 12 of the discharge portion 6; see FIG. 1.

The cooling shaft 17 includes a cooling section 15 with a corresponding transportation section 32.

The various transportation sections, the lifting/lowering device (not shown) and the various article carriers jointly form a transportation device 7 for transporting circuit boards between the feed portion 3 and the discharge portion 6 through the heating portion 5.

Furthermore, it should be noted that the article carriers 26 may also be designed to be movable through the connection shaft 18, with the two transfer devices 24 and 25 at the lower ends 29 and 30 of preheating shaft 16 and cooling shaft 17 serving to transfer or divert the article carriers between the shafts.

The method of the heating apparatus of the invention for processing, in particular, circuit boards shall now be described with reference to the flow chart of FIG. 3.

Circuit boards 2, see FIG. 1, are fed by means of a transportation belt of the heating apparatus of the invention in the feed portion 3 thereof. The circuit boards are then transported along the transportation direction 4 through the heating apparatus up to a transportation belt 20 in the discharge portion 6.

When the feed portion 3 is arranged in a horizontal plane differing from the feed plane 35 (see FIG. 2), the supplied circuit board is lifted by means of the lifting device 11 to the feed plane 35 of the heating portion 5 and is there fed by means of a transfer device 33 directly to an article carrier 26 or first to a further transportation belt 38. In cases where such an additional transportation belt is used, the belt serves to transfer the circuit board to the article carrier 26.

Subsequently, the article carrier 26 is lowered in the preheating section 13 along the preheating shaft 16 (see FIG. 2), and the circuit board is heated.

At the end of the preheating section or at the end of the preheating shaft, the circuit board or the article carrier 26 with the circuit board is transferred by means of a further transfer device 24 to the connection shaft 18 (see FIG. 2) with the thermal processing section 14. In this section the circuit board is heated, for instance, until the solder paste melts so as to carry out reflow soldering. Other applications are the curing of adhesives or, for instance, the drying of varnish on the circuit boards.

The heat transfer to the circuit board may, for instance, be a convective one in the connection shaft by means of a corresponding heating device. Heating may additionally be supported by infrared radiation.

The connection shaft as well as the other shafts may be of a gas-tight structure wherein heating, processing and cooling of the circuit board may take place under an inert gas or gas mixture.

After passage through the thermal processing section in the connection shaft 18 (see FIG. 2), the circuit board or the article carrier with the circuit board is again transferred by means of the transfer device 25 to the vertically upwardly leading cooling shaft 17 (see also FIG. 2). In this cooling shaft, the circuit board passes through a cooling section and is removed at the upper end of the cooling shaft by means of a further transfer device 34 from the article carrier and is transferred directly or via the lifting/lowering device 11 to the transportation belt 20 of the discharge portion 6.

FIG. 3 shows the transportation path of the circuit board, optionally with article carrier, by the arrows shown in full line in the transportation direction 4. The arrows shown in broken line mark the article carrier transportation direction 37, where the article carriers can be transported with or without circuit board between the transfer devices 34 and 33 or between transfer device 34 via a feed/discharge station 36 to a buffer station 28. In the buffer station 28, article carriers which are not needed are stored and removed upon request.

The illustrated transportation device can also be used without article carriers; in such a case the circuit boards can directly be placed on conveyors as a transportation device which support, for instance, edge portions of the circuit boards.

Corresponding sensors for controlling the flow of material through the heating apparatus and for controlling the cooling, thermal-processing and preheating sections as well as the heating device are not shown for the sake of simplification.

Additional apparatus (not shown) for removing, heating and boiling the medium generating the solder vapor are provided for carrying out the vapor-phase soldering method, for which the illustrated embodiment is particularly suited. Furthermore, gas-tight side walls which extend upwards over the level of the transportation direction in the thermal processing portion exist above the medium producing the solder vapor. Chemically inert liquids which have a boiling point in the range of from 175° C. to 260° C., preferably 215° C., are used as soldering medium. These media which produce the inert solder vapor have a very high molecular weight so that an area of saturated vapor which due to the heaviness of the solder vapor in comparison with the ambient atmosphere remains entrapped in the "pot" formed by the side walls and does not volatilize is formed above the boiling medium. Therefore, the area of saturated vapor of the solder medium remains in the thermal processing portion which is lowered with respect to the feed/discharge portion and which is open towards the preheating and cooling shaft for transporting the subassemblies. Thanks to the open system, there is no rise in pressure caused by the boiling of the solder medium, so that the area of saturated vapor above the boiling medium has the same temperature as the boiling medium (boiling temperature). Therefore, this embodiment of the heating apparatus of the invention combines the advantages offered by a compact construction and the lowering of the subassemblies for carrying out the advantageous vapor-phase soldering method.

A very precise temperature-controlled reflow soldering process can be carried out under a particularly efficient heat transfer to the solder article with the aid of the vapor-phase soldering method which can be carried out in a particularly advantageous manner with the heating apparatus of the invention. The superheated vapor into which the solder article is lowered condenses on the components which are still in a cooler state, and, in particular, on the small connection legs of the components, so that the solder paste is molten very reliably and at a rapid pace. Since heat is passed to the solder article not by way of a temperature drop, as in the case of convection heating, but by the latent heat released during the phase transition from the gaseous to the liquid state at a substantially constant temperature, the solder article is reliably prevented from overheating. The heat transfer speeds during vapor phase soldering are very high and correspond to a heat transfer through a liquid heating medium. The vapor phase soldering method is therefore very fast and efficient. Moreover, the heat transfer is particularly pronounced on the small connection legs of the components at which the solder paste exists, since these members have a particularly high ratio of their exposed condensation surface to their entire volume (due to the small thickness of the legs).

I claim:

1. A heating apparatus (1) for heating circuit boards (2), comprising a feed portion (3) for feeding the circuit boards in a substantially horizontal direction, at least one heating portion (5) following in transportation direction (4) downstream of the feed portion, a discharge portion (6) for the discharge of circuit boards supplied from the heating portion in a substantially horizontal direction, and a transportation device (7) connecting feed portion (3), heating portion (5) and discharge portion (6), characterized in that a transportation path (9) of the transportation device (7) in the heating portion (5) extends in a plane (10) substantially in a direction transverse to the horizontal feed or discharge direction (4) and the transportation path (9) connects feed and discharge portions (3, 6) in substantially ring-like configuration.

2. The heating apparatus according to claim 1, characterized in that the transportation device (7) comprises a lifting and lowering device (11) for transferring the circuit boards (2) from or to the feed portion (3) and/or the discharge portion (6).

3. The heating apparatus according to claim 1, characterized in that feed portion (3) and discharge portion (6) are arranged in a horizontal plane (12).

4. The heating apparatus according to claim 1, characterized in that the heating portion (5) along the transportation path (9) has at least one preheating section (13), a thermal processing section (14) and a cooling section (15).

5. The heating apparatus according to claim 4, characterized in that the preheating section (13) is designed as a preheating shaft (16) passing vertically downwards from the transportation device (7).

6. The heating device according to claim 4, characterized in that the cooling section (15) is designed as a cooling shaft (17) passing vertically upwards from the transportation device (7).

7. The heating apparatus according to claim 4, characterized in that the thermal processing section (14) is designed as a connection shaft (18) connecting a preheating shaft (16) and cooling shaft (17) substantially at the lower ends (29, 30) thereof.

8. The heating apparatus according to claims 5 characterized in that means are provided for receiving a medium producing heated vapor required for a vapor-phase soldering method, means for heating and boiling the medium and means for preventing a lateral propagation of the heated vapor.

9. The heating apparatus according to claim 8, characterized in that the means for receiving and heating and boiling the medium are designed such that the heated vapor layer is formed above the boiling medium in the area of the thermal processing section which is arranged between the preheating shaft and the cooling shaft.

10. The heating apparatus according to claim 7, characterized in that preheating shaft (16) connection shaft, and cooling shaft (17) are made gas-tight.

11. The heating apparatus according to claim 7, characterized in that an inert gas, air, or gas mixture is contained in the preheating shaft (16), connection shaft (18), and cooling shaft.

12. The heating apparatus according to claim 7, characterized in that at least one heating device (19) is assigned to the connection shaft (18) for heat transfer to circuit boards (2).

13. The heating apparatus according to claim 1, characterized in that the heating device (19) additionally comprises a source of infrared radiation, at least in places.

14. The heating apparatus according to claim 1, characterized in that a transportation system (20) is assigned to feed and/or discharge portion (3, 6) for the supply or discharge of circuit boards to or from the heating apparatus (1).

15. The heating apparatus according to claim 7, characterized in that the connection shaft (18) comprises at least two heating zones (21, 22) that are differently heatable by the heating device (19).

16. The heating apparatus according to claim 7, characterized in that the transportation device (7) comprises different transportation sections (23, 31, 32) in the respective shafts (16, 17, 18), said transportation sections being interconnected by transfer devices (24, 25).

17. The heating apparatus according to claim 16, characterized in that transfer devices (24, 25, 33, 34) are arranged between feed and discharge portion (3, 6) and transportation device (7) for transferring circuit boards from the feed portion (3) to the transportation device (7) and from the transportation device (7) to the discharge portion (6), respectively.

18. The heating apparatus according to claim 1, characterized in that the transportation device (7) comprises article carriers (26) which are movable along the transportation path (9) at least in part.

19. The heating apparatus according to claim 17, characterized in that the transfer devices (24, 25, 33, 34) are designed for transferring circuit boards on article carriers (26).

20. The heating apparatus according to claim 1, characterized in that the transportation device (7) comprises a control system (27) for operating the transfer devices (24, 25, 33, 34), for controlling the article carrier (26).

21. The heating apparatus according to claim 19, characterized in that each article carrier (26) comprises an adjustable carrying device for receiving different sizes of circuit boards (2).

22. The heating apparatus according to claim 19, characterized in that the transfer devices (24, 25) are designed for transferring article carriers (26) between the shafts (16, 17, 18), and the article carriers (26) are movable in a circuit along the transportation path (9).

23. The heating apparatus according to claim 1, characterized in that the transportation device (7) comprises a buffer station (28) for storing or removing article carriers (26).

24. The heating apparatus according to claim 1, characterized in that sensors are assigned to feed portion (3) discharge portion (6), heating portion (5), and transportation device (7).

25. A heating apparatus according to claim 19, characterized in that each article carrier (26) can be adapted to different sizes of circuit boards (2).

26. The heating apparatus according to claim 25, characterized in that each article carrier (26) has an outer frame and a support device which is adjustable relative to said outer frame, for supporting at least one circuit board of different sizes.

27. The heating apparatus according to claim 7, characterized in that at least the heating device (19) comprises parallel and separately heatable transportation sections (31) for parallel processing of circuit boards (2) in the connection shaft (18).

28. A method for the thermal treatment of circuit boards, comprising the following steps:

feeding the circuit boards and transporting said circuit boards to a heating apparatus in a substantially horizontal direction, heating the circuit boards in the heating apparatus, and transporting the circuit boards away from the heating device for discharge again along a substantially horizontal direction, characterized in that the circuit boards are transported in the heating device along a path in a plane substantially in a direction transverse to the horizontal feed or discharge direction along a substantially ring-like path.

29. The method according to claim 28, characterized in that in the heating device the circuit board is preheated while being transported substantially vertically downwards, following the lowering step it is subjected to a main heating operation while being again transported in horizontal direction, and following the horizontal transportation it is again cooled while being transported in vertical direction.

30. The method according to claim 28, characterized in that convection heat is used for heating the circuit boards.

31. The method according to claim 28, characterized in that infrared radiation is provided for heating the circuit boards.

32. The method according to claim 28, characterized in that the individual steps of preheating, heating and cooling are carried out under the action of an inert gas flow or a gas mixture.

33. The method according to claim 28, characterized in that the circuit boards are loaded onto article carriers for transportation through the heating apparatus.

34. The method according to claim 33, characterized in that the article carriers are kept in stock in a buffer station and are fetched upon arrival of a new circuit board to be heat-treated.

* * * * *